Patented Nov. 10, 1953

2,658,908

UNITED STATES PATENT OFFICE 2,658,908

PRODUCTION OF HYDROLYZABLE SILOXANES

Siegfried Nitzsche and Ewald Pirson, Burghausen, Upper Bavaria, Germany, assignors, by mesne assignments, to Wacker-Chemie G. m. b. H., Munich, Germany No Drawing. Application June 21, 1951, Serial No. 232,874

Claims priority, application Germany July 27, 1950

6 Claims. (Cl. 260—448.2)

The present invention relates to methods for the production of alkoxy-, aryloxy- and/or acyloxysiloxanes.

Methods have been described in the prior art for the production of siloxanes which contain alkoxy substituents. In general, such siloxanes are produced by the hydrolysis of an alkoxy-containing silane. When such a silane is partially hydrolyzed, leaving a portion of the alkoxy radicals on the silicon, an alkoxy-substituted siloxane is obtained upon condensation of the hydrolyzate. An alternative method which has been disclosed in the art is the production of alkoxysiloxanes by reaction of a siloxane free of alkoxy radicals with an alcohol, such as ethanol, in the presence of an alkaline catalyst, such as sodium hydroxide. By this method some of the siloxane bondings are broken and alkoxy substituents derived from the alcohol bonded to the silicon at that position.

Neither of these methods is particularly satisfactory. If it is desired to make a linear or cyclic methylethoxypolysiloxane, partial hydrolysis of methyltriethoxysilane could be employed. However, when hydrolyzing two of the alkyl substituents on the silicon, there will be some silicons from which three alkoxy radicals are hydrolyzed and others from which only one will be hydrolyzed. This will result in a complex polymeric material of heterogeneous unit structure replete with cross linking and end-blocking.

It is obvious that the second above method will produce no better nor more consistent results than the first method.

Objects of the present invention are the provision of improved methods for the production of siloxanes of the indicated types and the provision of methods for the production of linear and cyclic siloxanes which contain a controllable distribution of substituents bonded to the silicon by oxygen.

In accordance with the present invention an organosiloxane which contains silicon-bonded hydrogen atoms is reacted with an alcohol, phenol or carboxy acid by maintaining a mixture of the two in contact with an ansolvo acid. (See Ellis, The Chemistry of Synthetic Resins, published in 1935 by Reinhold.)

The present invention has application to a broad range of siloxanes. In fact, any soluble siloxane having hydrogen bonded to silicon atoms thereof may be handled in accordance herewith. The present invention does have particular application with reference to siloxanes of the general average formula

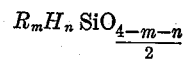

where R represents mono-valent hydrocarbon radicals free of aliphatic unsaturation, $m$ has an average value of from 1 to 2, inclusive, and $n$ has a positive value of up to and including 1. Preferentially, R represents methyl or phenyl, due to the importance of these particular substituents in organosilicon chemistry. Obviously, however, the invention is much broader than these two substituents, which are of present commercial importance.

Under normal circumstances the alcohols, the phenols and the carboxy acids do not react with hydrogen-bearing siloxanes to displace the hydrogen from the silicon. This type reaction is obtained by the employment in the reaction mixture of the ansolvo acids, which have been defined in the literature as neutral molecules which combine with a solvent, increasing its acidity by forming complex anions. In accordance with this invention, zinc chloride is preferred for this purpose. However, other ansolvo acids may be employed, as for example, magnesium chloride, zinc chlorate, boron trifluoride and the like. It is noted that boron trifluoride in acetic acid produces effectively an acid of strength comparable to sulfuric acid, due to anion complex formation. It would be normally expected that such acids would cleave the hydrogen from the silicon of the siloxane but would not introduce substituents into the siloxane. Instead, siloxane bondings would be formed. The applicants have found that the present invention results in the insertion of new substituents in the siloxane.

Example 1

A mixture was prepared of 150 cc. of absolute ethanol and 75 grams of the hydrolysis product of methyldichlorosilane. To this mixture 5 grams of anhydrous zinc chloride was added. The mixture so prepared was allowed to stand for one day. The reaction commenced immediately, as shown by the evolution of hydrogen. After standing for one day, the mixture was heated under reflux and as no further hydrogen was evolved, there was shown that all hydrogen from the composition had been liberated. Excess alcohol was removed from the reaction product by distillation. Removal of the alcohol resulted in precipitation of the zinc chloride, which was removed by filtering. There was thereby obtained 80 grams of a methylethoxypolysiloxane.

*Example 2*

A mixture was prepared of 40 grams of anhydrous acetic acid and 20 grams of methylhydrogenpolysiloxane, as described in Example 1. To this mixture 5 grams of anhydrous zinc chloride was added and the mixture warmed slightly. Hydrogen was evolved at a reasonable rate, which was controllable by controlling the temperature. The mixture had originally been one consisting of two liquid phases. After the reaction had progressed to some extent, the two layers formed a single homogeneous solution. After standing two hours, the acetic acid was distilled off under vacuum and the zinc chloride removed by filtration. A colorless oil which was methylacetoxysiloxane was thereby obtained.

*Example 3*

The process of Example 2 was conducted using boron trifluoride in place of zinc chloride. An equivalent methylacetoxysiloxane was thereby obtained.

*Example 4*

A siloxane resin which had been produced by the hydrolysis of methyltrichlorosilane and dimethyldichlorosilane and which contained silicon-bonded hydrogen in an amount reflecting one hydrogen per five hundred silicon atoms was mixed with one per cent by weight of ethanol and .01 per cent by weight of zinc chloride. The resin was then heated at about 50° C. for two hours, with stirring. The resin was then heated to remove the ethanol by distillation and filtered to clarify. The properties of such molding resins are improved by the liberation therefrom of silane hydrogen.

The products hereof have a wide range of utility, being useful as water repellents, as laminating resins for panel board and in the production of high vacuum pump fluids.

That which is claimed is:

1. The method for the production of siloxanes which contain substituents of the group consisting of alkoxy, aryloxy and acyloxy which comprises maintaining (1) a siloxane of the average general formula $$R_m H_n SiO_{\frac{4-m-n}{2}}$$

in which R represents hydrocarbon radicals free of aliphatic unsaturation, $m$ has a value of from 1 to 2, inclusive, and $n$ has a positive value up to and including 1, and (2) a reactant of the group consisting of alcohols, phenols and carboxy acids in contact with an ansolvo acid, whereby a substituent of the group consisting of alkoxy, aryloxy and acyloxy is substituted for the hydrogen of said siloxane with the liberation of free hydrogen.

2. The method in accordance with claim 1 in which the ansolvo acid employed is zinc chloride.

3. The method in accordance with claim 1 in which the alcohol is a lower alkyl alcohol.

4. The method in accordance with claim 1 in which the alcohol is ethanol.

5. The method in accordance with claim 1 in which the carboxy acid is acetic acid.

6. The method in accordance with claim 1 in which the siloxane is a methylhydrogenpolysiloxane.

SIEGFRIED NITZSCHE.
EWALD PIRSON.

References Cited in the file of this patent

UNITED STATES PATENTS

| Number | Name | Date |
|---|---|---|
| 2,537,073 | MacKenzie et al. | Jan. 9, 1951 |

OTHER REFERENCES

Ellis, The Chemistry of Synthetic Resins, vol. I, pg. 194, Reinhold, 1935.